(12) United States Patent
Yuan et al.

(10) Patent No.: US 10,044,833 B2
(45) Date of Patent: Aug. 7, 2018

(54) DATA PROCESSING METHOD AND APPARATUS USED FOR TERMINAL APPLICATION

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventors: Jiaquan Yuan, Beijing (CN); Shiwei Lu, Beijing (CN)

(73) Assignees: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 234 days.

(21) Appl. No.: 15/113,496

(22) PCT Filed: Jan. 22, 2015

(86) PCT No.: PCT/CN2015/071349
§ 371 (c)(1),
(2) Date: Jul. 22, 2016

(87) PCT Pub. No.: WO2015/110047
PCT Pub. Date: Jul. 30, 2015

(65) Prior Publication Data
US 2017/0013083 A1    Jan. 12, 2017

(30) Foreign Application Priority Data
Jan. 22, 2014   (CN) .......................... 2014 1 0030339

(51) Int. Cl.
G06F 15/16     (2006.01)
H04L 29/08     (2006.01)
H04L 29/06     (2006.01)

(52) U.S. Cl.
CPC ............ H04L 67/325 (2013.01); H04L 67/06 (2013.01); H04L 67/34 (2013.01); H04L 67/42 (2013.01)

(58) Field of Classification Search
CPC ........ H04L 67/325; H04L 67/06; H04L 67/34
(Continued)

(56) References Cited

FOREIGN PATENT DOCUMENTS

CN    101594216 A    12/2009
CN    101764746 A    6/2010
(Continued)

OTHER PUBLICATIONS

International Search Report and Written Opinion, PCT/CN2015/071349, dated Apr. 27, 2015, 9 pages.

*Primary Examiner* — Glenford Madamba
(74) *Attorney, Agent, or Firm* — Michael Best & Friedrich LLP

(57) ABSTRACT

Disclosed is a data processing method used for a terminal application, comprising: an information obtaining step for obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and a transmission piece number determining step for determining, as for transmitting the data to the server for first and second times, a number of pieces of the data transmitted to the server for
(Continued)

the first and second times to be the minimum number of pieces included in the basic transmission parameter configuration information, and determining, as for transmitting each time after transmitting the data to the sever for the second time, a number of pieces of the data transmitted to the server for a current time in accordance with network transmission speeds for the previous two times. Also disclosed is a data processing apparatus used for the terminal application. The invention can reasonably use network resources to dynamically upload APP data.

12 Claims, 4 Drawing Sheets

(58) Field of Classification Search
USPC .......................................................... 709/219
See application file for complete search history.

(56) References Cited

FOREIGN PATENT DOCUMENTS

| CN | 102546832 A | 7/2012 |
|---|---|---|
| CN | 103856558 A | 6/2014 |

DATA PROCESSING METHOD AND APPARATUS USED FOR TERMINAL APPLICATION

TECHNICAL FIELD

The invention relates to the field of communication technology, and specifically relates to a data processing method and apparatus used for a terminal application.

BACKGROUND ART

In the field of communication technology, mobile terminals such as smart mobile phones, tablet computers and wearable devices are widely used, so various APP (abbreviation of Application) applications used for smart terminals emerge as the times require, and a large number of solutions emerge around the APP applications, where most of the APP applications are required to upload local data to a server via a network, and record updated terminal user information.

At present, due to limitations of factors such as network and hardware, most of the APPs of the smart terminals adopt an upload manner in a C/S (Client/Server) mode, an HTTP (Hypertext transfer protocol) mode or a WIFI mode when uploading the data, and these manners do not consider particularity of the terminal and network traffic, and do not consider a condition of resource occupancy either, and thus easily result in a failure of data upload. By taking a game APP as an example, the APP application is started after a player clicks an icon of the APP, a game interaction with the player is started, at the same time, player information is collected at a back stage to be uploaded to the server, since network resources are to be occupied to upload the data, when the network is congested, an action of uploading the data inevitably influences a game process at a front stage, which results in a game screen played unsmoothly and influences user experience, and when a circumstance where the APP application is shut down abnormally, the data being uploaded cannot be uploaded in time, which easily causes data loss. Obviously, this has a comparatively large impact on the APP application required to collect APP using behaviors of the users.

SUMMARY OF THE INVENTION

In view of this, the invention provides a data processing method and apparatus used for a terminal application, which dynamically adjust an amount of data to be transmitted by stages in accordance with a network speed of a terminal, consider characteristics of the terminal and its usage scene, and achieve a balance between a real-time performance of data upload and a fluency of an APP running.

The invention provides a data processing method used for a terminal application, comprising: an information obtaining step for obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and a transmission piece number determining step for determining, as for transmitting the data to the server for first and second times, a number of pieces of the data transmitted to the server for the first and second times to be the minimum number of pieces included in the basic transmission parameter configuration information, and determining, as for transmitting each time after transmitting the data to the sever for the second time, a number of pieces of the data transmitted to the server for a current time in accordance with network transmission speeds for the previous two times, wherein the network transmission speed is a ratio of a number of pieces of the transmitted data to time consumed for transmission when the data is transmitted to the server at the single time.

Preferably, a number of pieces $Q_N$ of the data transmitted to the server for an $N^{th}$ time determined based on the network transmission speeds for an $N-2^{th}$ time and an $N-1^{th}$ time is as follows: $Q_N = Q_{N-1}(1+PN_{N-1})$, wherein $P_{N-1} = (S_{N-1}-S_{N-2})/S_{N-2}$, N is a positive integer, and N>2, and wherein $S_{N-2}$ and $S_{N-1}$ are respectively the network transmission speeds when the data is transmitted to the server for the $N-2^{th}$ time and the $N-1^{th}$ time.

Preferably, the maximum number of pieces is set to a number of transmission pieces if the determined number of transmission pieces is larger than the maximum number of pieces.

Preferably, transmission is given up and the next transmission is regarded as transmitting the data to the server for the first time if the determined number of transmission pieces is less than or equal to 0.

Preferably, after the transmission is given up, the next transmission is performed over the maximum time interval.

Preferably, the information obtaining step and the transmission piece number determining step are performed in a sub-thread of the application.

The invention also provides a data processing apparatus used for a terminal application, comprising: an information obtaining module for obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and a transmission piece number determining module for determining, as for transmitting the data to the server for first and second times, a number of pieces of the data transmitted to the server for the first and second times to be the minimum number of pieces included in the basic transmission parameter configuration information, and determining, as for transmitting each time after transmitting the data to the sever for the second time, a number of pieces of the data transmitted to the server for a current time in accordance with network transmission speeds for the previous two times, wherein the network transmission speed is a ratio of a number of pieces of the transmitted data to time consumed for transmission when the data is transmitted to the server at the single time.

The invention has the following advantageous effects: the invention designs a dynamically adjusting mechanism with respect to a number of pieces of APP data transmission, which can avoid a loss of a fluency of an APP running due to an excessive loss of the transmitted data under a circumstance where network resources are insufficient. The use of the invention to perform a processing of transmitting the APP data can reasonably use the network resources to complete a task of uploading the APP data and avoid a loss of the APP data, which is particularly appropriate to an occasion where a large number of APP user behavior data is to be uploaded.

DETAILED DESCRIPTION

Figure 1:
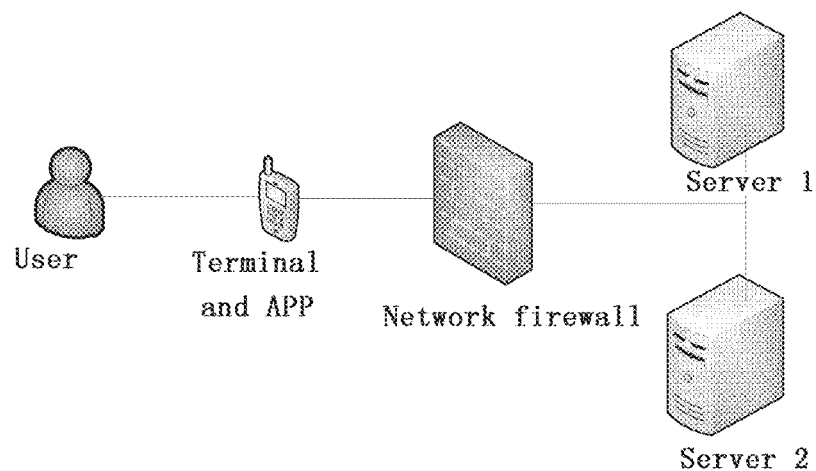
FIG. 1 is a structural schematic diagram of a network connection of a mobile phone user side and a server side.

The technical solutions of the invention are described in detail below by taking the figures into consideration and by giving examples of embodiments:

FIG. 1 shows a structural schematic diagram of a conventional network connection of a mobile phone user side and a server side by taking a smart mobile phone as an example. A user starts an APP of the mobile phone, requests a server 1 to verify the APP, and obtains basic transmission parameter configuration information from the server 1; after the verification of the APP passes, when there is APP data to be transmitted, the APP data is uploaded to a server 2 based on the basic transmission parameter configuration information. Generally, with respect to an APP installed in a smart terminal, each time the APP is started, processes such as start, verification, data upload and data storage of the APP will be performed.

Figure 2:
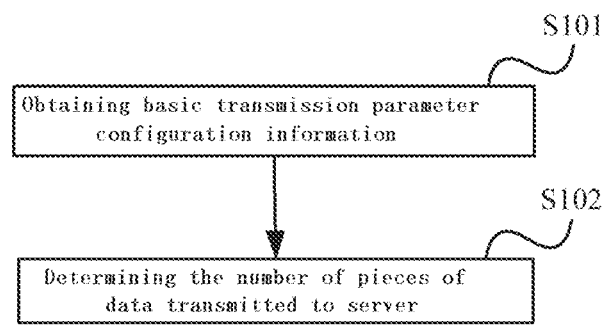
FIG. 2 is a flow chart of a data processing method used for a terminal application according to an embodiment of the invention.

The present invention proposes processing solutions around an upload processing flow of the APP data. FIG. 2 is a flow chart of a data processing method used for a terminal application according to an embodiment of the invention, comprising:

S101, an information obtaining step: obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and S102, a transmission piece number determining step: determining, as for transmitting the data to the server for first and second times, a number of pieces of the data transmitted to the server for the first and second times to be the minimum number of pieces included in the basic transmission parameter configuration information, and determining, as for transmission each time after transmitting the data to the sever for the second time, a number of pieces of the data transmitted to the server for a current time in accordance with network transmission speeds for the previous two times, wherein the network transmission speed is a ratio of a number of pieces of the transmitted data to time consumed for transmission when the data is transmitted to the server at the single time.

In an actual application scene, still by taking the smart mobile phone as the example, with respect to the step S101, after the user of the mobile phone starts the APP, the APP obtains from the server side the "basic transmission parameter configuration information", i.e., a basic transmission strategy, which prescribes that when a server side configuration is used, a minimum number of pieces and a maximum number of pieces transmitted by an APP transmission thread each time are allowed; which also prescribes that when the amount of the APP data is very large and the transmission thread is required to continuously transmit several times, in order to make the mobile phone release and recover CPU, memory and network resources, and ensure that mobile phone resources are not occupied for a long time, a minimum time interval between two times of continuous transmission, and a maximum waiting time interval of polling of the transmission thread when the APP has no data to be uploaded are set.

With respect to the step S102, the embodiment of the invention dynamically adjusts the amount of the APP data transmission. The APP data is uploaded to the server after being subjected to a compression, wherein the number of pieces of the data transmitted to the server for the first and second times is executed according to the minimum number of pieces prescribed by the "basic transmission parameter configuration information" obtained in the step S101, i.e., if the minimum number of pieces is 10, 10 pieces of the APP data are transmitted to the server for the previous two times; then starting from transmitting for a third time, it is not prescribed that 10 pieces must be transmitted, but the number of pieces transmitted to the server for the current time is dynamically determined in accordance with the network transmission speeds for the previous two times each time.

The use of the invention to perform processing of the APP data transmission avoids transmitting excessive data under a circumstance where the network is congested to influence a usage fluency of the APP, reasonably uses the network resources to rapidly complete a task of uploading the APP data, and avoids a loss of the APP data.

In a preferred embodiment of the invention, the number of pieces of the data transmitted for the current time can be determined in accordance with a change rate of the network transmission speeds for transmitting the data for the previous two times. To be specific, related variables and calculation methods are as follows:

1) the minimum number of pieces of basic transmission: MinNQ, e.g., MinNQ=10;
2) the maximum number of pieces of basic transmission: MaxNQ, e.g., MaxNQ=50;

wherein items 1) and 2) are parts of the basic transmission parameter configuration information obtained from the server side, 3) the number of pieces transmitted for the first time being prescribed as the minimum number of pieces, i.e., Q1=MinNQ;
4) the network transmission speed for the first time being as follows: S1=Q1/the time consumed for transmitting for the current time ST1;
5) the number of pieces transmitted for the second time being also prescribed as the minimum number of pieces, i.e., Q2=MinNQ;
6) the network transmission speed for the second time being as follows: S2=Q2/the time consumed for transmitting for the current time ST2;
7) the transmission speed relative to that for the first time being calculated, an increase rate of the transmission speed for the second time being as follows: P2=(S2−S1)/S1;

8) the number of pieces transmitted for the third time being determined by means of a calculation as follows: Q3=Q2*(1+P2);
9) the network transmission speed for the third time being as follows: S3=Q3/the time consumed for transmitting for the current time ST3;

similarly, the rest being deducible from this as follows:

10) the network transmission speed for the (n−2)$^t$ time being as follows: SN_2=the number of pieces transmitted for the current time QN_2/the time consumed for transmitting for the current time STN_2;
11) the network transmission speed for the (n−1)$^{th}$ time being as follows: SN_1=the number of pieces transmitted for the current time QN_1/the time consumed for transmitting for the current time STN_1;
12) then, the increase rate of the transmission speed for the (n−1)$^t$ time relative to the transmission speed for the (n−2)$^{th}$ time being as follows: PN_1=(SN_1−SN_2)/SN_2; and
13) then, the number of pieces transmitted for the N$^{th}$ time being obtainable by means of a calculation as follows: QN=QN_1*(1+PN_1), wherein a calculation result QN is an integer.

The contents above introduce a manner of determining the number of pieces of the transmitted data in accordance with the change rate of the network transmission speed, and the change rate, i.e., the increase rate P, is obtained by means of a calculation in accordance with the network transmission speeds for the previous two times. The larger the increase rate is, the better a current network state is, and the more data that can be transmitted are, which will not influence the fluency of the APP running; on the contrary, the smaller the increase rate is (or even the increase rate is negative), the worse the current network state is, and the fewer the network resources are, in order to ensure that the APP runs normally, the number of pieces of the transmitted data should be correspondingly reduced, and the number of transmission pieces can be specifically determined according to the calculation method in the item 13) above.

To be more specific, Table 1 lists related data records of using the preferred embodiment of the invention to upload the APP data to the server, including the number of pieces of the transmitted data, the time consumed for transmission, the network transmission speed and the increase rate each time in a process from transmission for the first time to transmitting for the thirteen time. According to the invention, the number of pieces transmitted for the first and second times is the minimum number of pieces, i.e., 10 pieces, prescribed by a basic transmission parameter configuration of the server. In order to determine the number of pieces transmitted for the third time, it is calculated that the increase rate P$_2$=(6.66−8.33)/8.33=−0.2, so the number of pieces transmitted for the third time should be as follows: 10*(1+(0.2))= 8. By taking transmission conditions for the eleventh time, the twelfth time and the thirteenth time as examples, the increase rate for the eleventh time is P$_{11}$=0.81, so the number of pieces transmitted for the twelfth time obviously increases (increasing from 17 pieces to 30 pieces), but along with the slowing of the network transmission speed (decreasing from 34 to 5), P$_{12}$=−0.85, which is negative, the number of pieces transmitted for the thirteenth time correspondingly greatly decreases from 30 to 4. As can be seen, performing the data processing according to the present invention can automatically adjust an amount of data transmission according to a network state to make the two parts tend to a dynamic balance, complete a task of uploading data in time under a limited network resource condition, avoid data loss, and facilitate continuous collection and upload of new data.

TABLE 1

| Time of transmission | Number of transmission pieces (Q) | Time consumed for transmission (ST) Unit: second | Network transmission speed (Q/ST) | Increase rate (P) |
|---|---|---|---|---|
| 1 | 10 | 1.2 | 8.33 | / |
| 2 | 10 | 1.5 | 6.66 | −0.2 |
| 3 | 8 | 1 | 8 | 0.2 |
| 4 | 9 | 0.8 | 11.25 | 0.4 |
| 5 | 12 | 0.8 | 15 | 0.33 |
| 6 | 16 | 0.9 | 17.78 | 0.18 |
| 7 | 18 | 1 | 18 | 0.01 |
| 8 | 18 | 0.8 | 22.5 | 0.25 |
| 9 | 22 | 1.4 | 15.71 | −0.3 |
| 10 | 15 | 0.8 | 18.75 | 0.19 |
| 11 | 17 | 0.5 | 34 | 0.81 |
| 12 | 30 | 6 | 5 | −0.85 |
| 13 | 4 | 1 | 4 | −0.2 |

Further, with respect to the determined number of transmission pieces, on the one hand, if the number of transmission pieces is larger than the maximum number of pieces MaxNQ prescribed by the basic transmission parameter configuration, MaxNQ is taken as the number of transmission pieces for the current time to perform transmission, and a possible network congestion caused by excessive data transmission is controlled.

On the other hand, if the calculated number of transmission pieces is less than or equal to 0, the transmission for the current time is given up, and is not included in a basis for calculating the number of pieces transmitted next time; a transmission flow waits for an arrival of a next transmission period, e.g., the transmission thread is polled to a next period over the maximum time interval prescribed by the basic transmission parameter configuration, determination of the number of transmission pieces newly begins, i.e., the next transmission time is used as the transmission for the first time, the number of pieces transmitted each time thereafter is still determined according to the step S102 in the embodiment of FIG. 2 of the present invention, and the dynamic upload of the APP data is performed.

Figure 3:
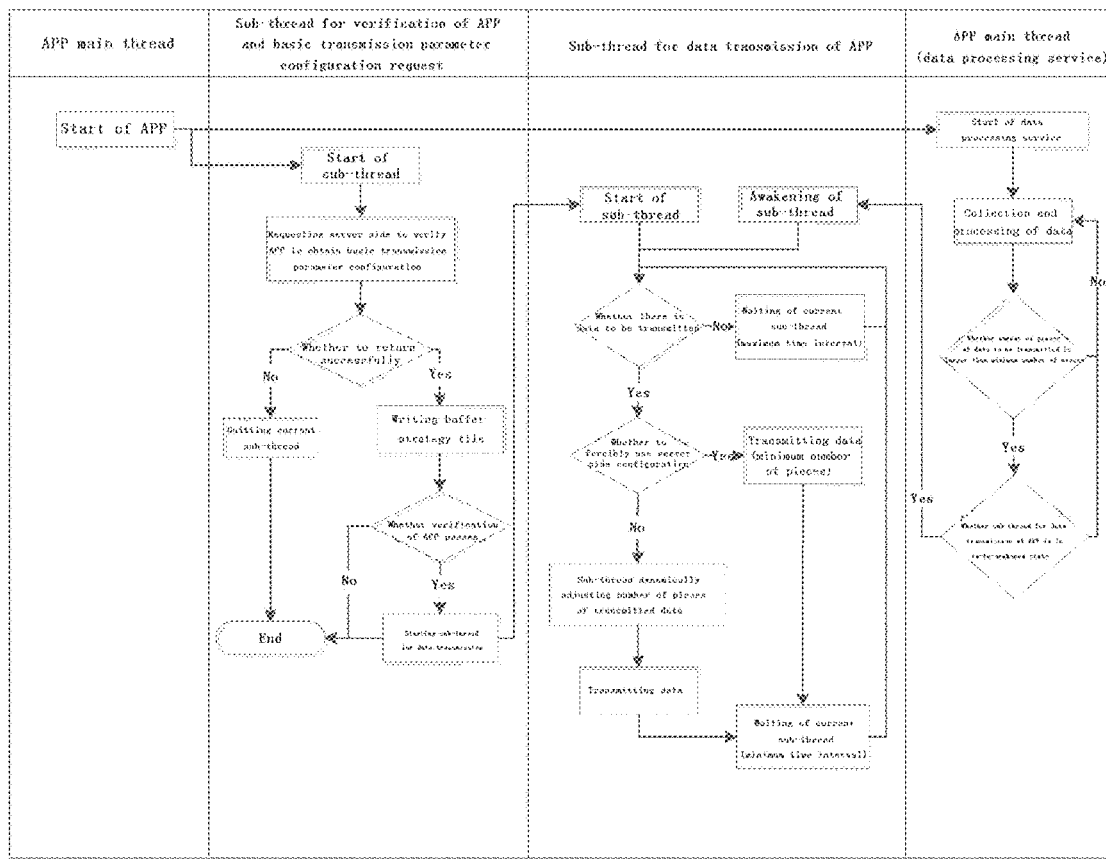
FIG. 3 and FIG. 4 are respectively flow charts of data transmission after an APP is started for first and second times after a user installs the APP.
Figure 4:
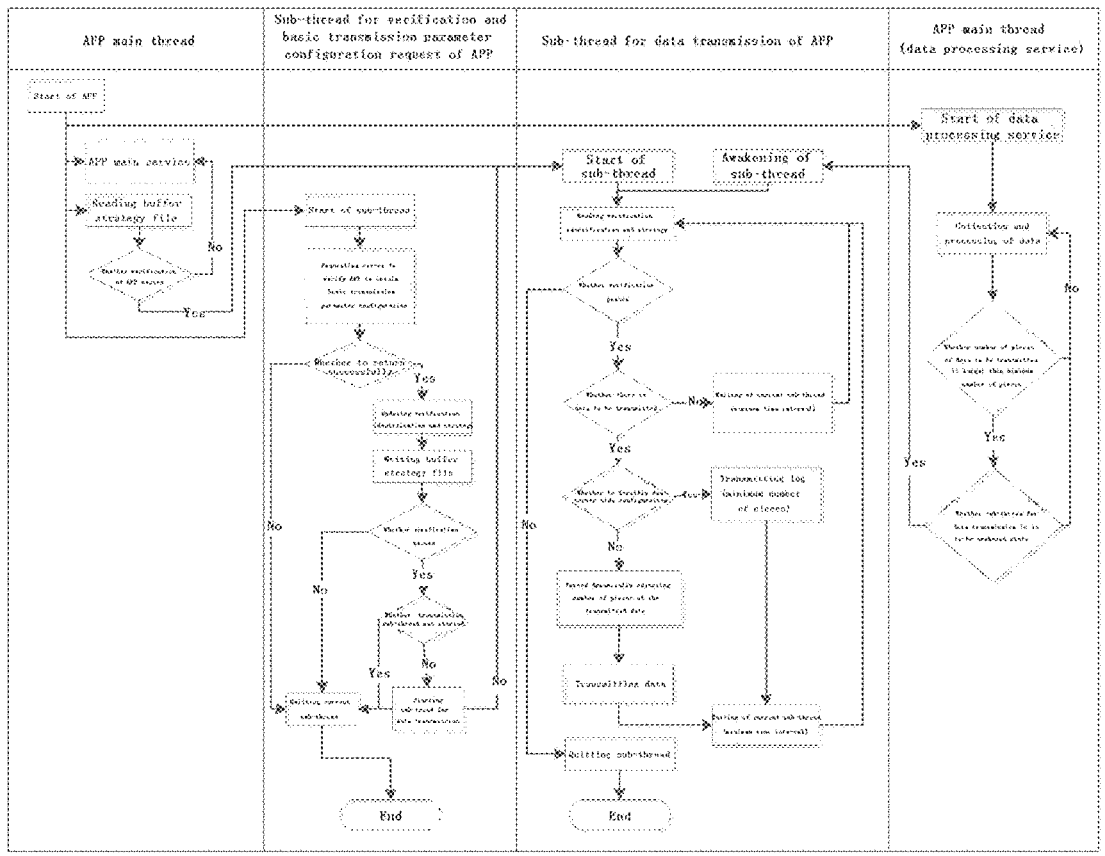

FIG. 3 and FIG. 4 respectively show flow charts of data transmission after an APP is started by taking conditions after the APP is started for the first and second times after a user installs the APP as examples. With respect to the start, verification and basic transmission parameter configuration request, data transmission and data processing service of the APP, preferably, in the embodiment of the present invention, the start and data processing service of the APP are performed in a main thread of the APP, the verification and basic transmission parameter configuration request and the data transmission of the APP are performed in a sub-thread of the APP, and the processes performed in the sub-thread do not occupy the main thread.

To be specific, as shown in FIG. 3, after the APP is started for the first time, on the one hand, the sub-thread for the verification and basic transmission parameter configuration request of the APP is started, and the following processes are performed in the sub-thread: requesting the server to verify the APP, requesting the server to transmit the basic transmission parameter configuration information, writing a buffer strategy file after receiving information returned from the server, judging whether the verification of the APP passes, starting the sub-thread for the data transmission of the APP is started if the verification passes, otherwise the flow is ended. In addition, if no information returned from the server is received, the current sub-thread is directly quitted, and the flow is ended. With respect to the sub-thread for the data transmission of the APP, it is detected whether there is data to be transmitted after the sub-thread is started, if so, it is judged whether to forcibly use a server configuration, and if not, an arrival of a next transmission period is waited for (the waiting time is the maximum time interval). With respect to the condition where there is data to be transmitted, if a system specifies that the server configuration is forcibly used, the data transmission is performed according to the server configuration, i.e., the minimum number of data is transmitted each time; if the system does not specify that the server configuration is forcibly used, the data transmission is performed according to the solution provided by the present invention, i.e., the number of pieces of the transmitted data is dynamically adjusted till the upload of all of the data to be transmitted is completed, and an arrival of a next transmission period is waited for (the waiting time is the minimum time interval).

On the other hand, after the APP is started for the first time, the main thread for the data processing service of the APP is also started, and the following processes are performed in the main thread: performing processes such as collection and compression of the APP data, judging whether the number of pieces of the processed data is larger than the minimum number of pieces, continuing to collect and compress the data if the minimum number of pieces is not reached, judging whether the sub-thread for the data transmission of the APP is in a to-be-awakened state after the minimum number of pieces is reached, if so, awakening the sub-thread for the data transmission of the APP, using the collected and compressed data as the data to be transmitted, and entering the sub-thread for the data transmission of the APP to perform the data transmission.

FIG. 4 is a flow chart of data transmission after the APP is started for the second time. Similar to the processes after the APP is started for the first time in FIG. 3, the processes of requesting the server to verify the APP, requesting the server to transmit the basic transmission parameter configuration information, and starting the sub-thread for the data transmission of the APP after the verification passes are performed in the main thread for the verification and basic transmission parameter configuration request of the APP, and the data transmission is performed in the sub-thread for the data transmission of the APP.

According to the processing flow above, when a dynamically adjusting mechanism of the number of pieces of the APP data transmission of the invention is not required to be used, the system can be set to "forcibly use the server side configuration", so in the sub-thread for the data transmission of the APP, transmitting data each time is performed according to the basic transmission parameter configuration. On the contrary, the system is set to "not forcibly use the server side configuration", so the number of transmission pieces is determined according to the dynamically adjusting mechanism of the invention in the sub-thread for the data transmission of the APP. The contents above serve as a conversion between a traditional transmission mode and a dynamic transmission mode, and the user can set the transmission mode according to a specific application occasion.

Figure 5:
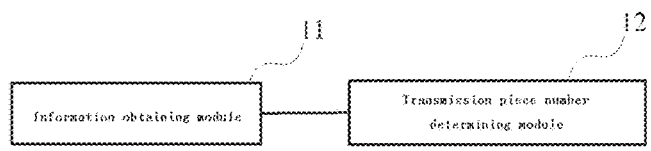
FIG. 5 is a structural schematic diagram of a data processing apparatus used for a terminal application according to an embodiment of the invention.

In addition, the invention also provides a data processing apparatus used for a terminal application. FIG. 5 shows a structural block diagram of the apparatus, comprising:

an information obtaining module 11 for obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and a transmission piece number determining module 12 for determining, as for transmitting the data to the server for first and second times, a number of pieces of the data transmitted to the server for the first and second times to be the minimum number of pieces included in the basic transmission parameter configuration information, and determining, as for transmitting each time after transmitting the data to the sever for the second time, a number of pieces of the data transmitted to the server for a current time in accordance with network transmission speeds for the previous two times, wherein the network transmission speed is a ratio of a number of pieces of the transmitted data to time consumed for transmission when the data is transmitted to the server at the single time.

Figure 6:
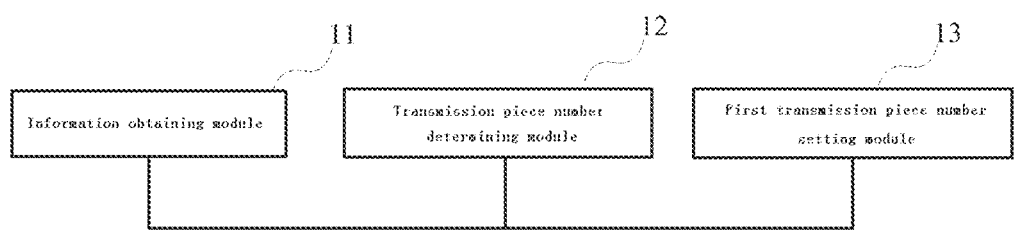
FIG. 6 is a structural schematic diagram of a data processing apparatus used for a terminal application according to another embodiment of the invention.

Further, the data processing apparatus in the embodiment of FIG. 5 can further comprise a first transmission piece number setting module 13, as shown in FIG. 6, which is used for setting the maximum number of pieces included in the basic transmission parameter configuration information to a number of pieces transmitted for an $M^{th}$ time when the number of pieces of the data transmitted to the server for the $M^{th}$ time determined by the transmission piece number determining module is larger than the maximum number of pieces.

Figure 7:
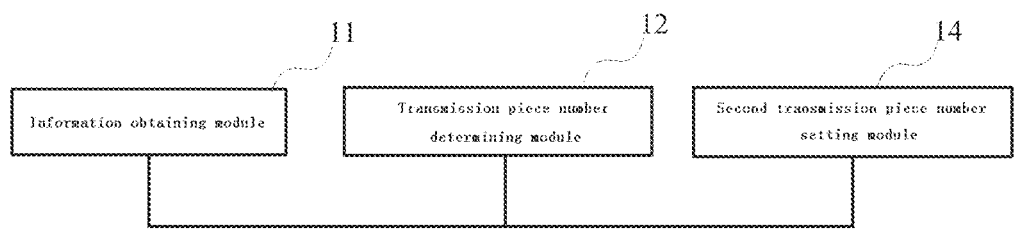
FIG. 7 is a data processing apparatus used for a terminal application according to a further embodiment of the invention.

Further, the data processing apparatus in the embodiment of FIG. 5 can further comprise a second transmission piece number setting module 14, as shown in FIG. 7, which is used for giving up the transmission for the $M^{th}$ time and regarding transmission for an $M+1^{th}$ time as transmitting the data to the server for the first time when the number of pieces of the data transmission for the $M^{th}$ time determined by the transmission piece number determining module is less than or equal to 0.

The contents above introduce the technical solutions of the invention in detail by taking the embodiments into consideration, and the described embodiments are used for helping understanding of the concept of the invention. Deductions and modifications made by those skilled in the art on the basis of the embodiments of the invention also fall within the scope of protection of the invention.

The invention claimed is:

1. A data processing method used for a terminal application, characterized by comprising:

an information obtaining step for obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and a transmission piece number determining step for determining, as for transmitting the data to the server for first and second times, a number of pieces of the data transmitted to the server for the first and second times to be the minimum number of pieces included in the basic transmission parameter configuration information, and determining, as for transmitting each time after transmitting the data to the sever for the second time, a number of pieces of the data transmitted to the server for a current time in accordance with network transmission speeds for the previous two times; wherein the network transmission speed is a ratio of a number of pieces of the transmitted data to time consumed for transmission when the data is transmitted to the server at the single time.

2. The data processing method used for a terminal application according to claim 1, characterized in that a number of pieces $Q_N$ of the data transmitted to the server for an $N^{th}$ time determined based on the network transmission speeds for an $N-2^{th}$ time and an $N-1^{th}$ time is as follows:

$$Q_N = Q_{N-1}(1+P_{N-1}),$$

wherein $P_{N-1}=(S_{N-1}-S_{N-2})/S_{N-2}$, N is a positive integer, and N>2, and wherein $S_{N-2}$ and $S_{N-1}$ are respectively the network transmission speeds when the data is transmitted to the server for the $N-2^{th}$ time and the $N-1^{th}$ time.

3. The data processing method used for a terminal application according to claim 1, characterized by, after the transmission piece number determining step, further comprising setting the maximum number of pieces to a number of transmission pieces if the determined number of transmission pieces is larger than the maximum number of pieces.

4. The data processing method used for a terminal application according to claim 1, characterized by, after the transmission piece number determining step, further comprising giving up transmission and regarding the next transmission as transmitting the data to the server for the first time if the determined number of transmission pieces is less than or equal to 0.

5. The data processing method used for a terminal application according to claim 4, characterized in that after the transmission is given up, the next transmission is performed over the maximum time interval.

6. The data processing method used for a terminal application according to claim 1, characterized in that the information obtaining step and the transmission piece number determining step are performed in a sub-thread of the application.

7. A data processing apparatus used for a terminal application; comprising:
a processor;
a memory;
the data processing apparatus further characterized by comprising:
an information obtaining module for obtaining basic transmission parameter configuration information from a server, the basic transmission parameter configuration information including a minimum number of pieces and a maximum number of pieces of data transmitted to the server at a single time when a terminal uploads the data to the server, and a minimum time interval and a maximum time interval between two times of transmission when the data is transmitted continually; and
a transmission piece number determining module for determining, as for transmitting the data to the server for first and second times, a number of pieces of the data transmitted to the server for the first and second times to be the minimum number of pieces included in the basic transmission parameter configuration information, and determining, as for transmitting each time after transmitting the data to the server for the second time, a number of pieces of the data transmitted to the server for a current time in accordance with network transmission speeds for the previous two times, wherein the network transmission speed is a ratio of a number of pieces of the transmitted data to time consumed for transmission when the data is transmitted to the server at the single time.

8. The data processing apparatus used for a terminal application according to claim 7, characterized in that a number of pieces $Q_N$ of the data transmitted to the server for an $N^{th}$ time is determined by the transmission piece number determining module based on the network transmission speeds for an $N-2^{th}$ time and an $N-1^{th}$ time is as follows:

$$Q_N = Q_{N-1}(1+P_{N-1}),$$

wherein $P_{N-1}=(S_{N-1}-S_{N-2})/S_{N-2}$, N is a positive integer, and N>2, and wherein $S_{N-2}$ and $S_{N-1}$ are respectively the network transmission speeds when the data is transmitted to the server for the $N-2^{th}$ time and the $N-1^{th}$ time.

9. The data processing apparatus used for a terminal application according to claim 7, characterized by further comprising: a first transmission piece number setting module for setting the maximum number of pieces to a number of transmission pieces if the number of transmission pieces determined by the transmission piece number determining module is larger than the maximum number of pieces.

10. The data processing apparatus used for a terminal application according to claim 7, characterized by further comprising: a second transmission piece number setting module for giving up transmission and regarding the next transmission as transmitting the data to the server for the first time if the number of transmission pieces determined by the transmission piece number determining module is less than or equal to 0.

11. The data processing apparatus used for a terminal application according to claim 10, characterized in that the second transmission piece number setting module, after giving up the transmission, performs the next transmission over the maximum time interval.

12. The data processing apparatus used for a terminal application according to claim 7 characterized in that the information obtaining module and the transmission piece number determining module function in a sub-thread of the application.

\* \* \* \* \*